United States Patent [19]

Stammen

[11] 3,841,698

[45] Oct. 15, 1974

[54] VEHICLE WITH RETRACTABLE GUARD

[75] Inventor: Harold A. Stammen, New Bremen, Ohio

[73] Assignee: Crown Controls Corporation, New Breman, Ohio

[22] Filed: Feb. 26, 1973

[21] Appl. No.: 335,912

[52] U.S. Cl.......... 296/107, 214/DIG. 7, 280/150 C
[51] Int. Cl.............................................. B60j 7/00
[58] Field of Search........ 292/102, 107, 137 B, 108; 214/DIG. 7, 670, 671, 672, 673; 280/150 C

[56] References Cited
UNITED STATES PATENTS

| 132,531 | 10/1872 | Hazelip | 296/107 |
| 2,962,179 | 11/1960 | Molitor | 214/670 |
| 3,259,211 | 7/1966 | Ryskamp | 214/DIG. 7 |
| 3,519,155 | 7/1970 | Jefferson | 214/764 |

Primary Examiner—Robert G. Sheridan
Assistant Examiner—G. L. Auton
Attorney, Agent, or Firm—Biebel, French & Bugg

[57] ABSTRACT

A materials handling vehicle, such as a lift truck, is provided with a retractable guard over the operator's station to protect the operator from falling objects, while allowing the guard to be retracted to reduce the overall height of the vehicle and permit the vehicle to move into areas which would otherwise be inaccessible to it because of low ceiling height. The retracting mechanism is designed so that the guard may be raised and lowered while the operator is positioned in the vehicle and while the vehicle is moving, and operation of the mechanism is controlled by a simple switch.

11 Claims, 6 Drawing Figures

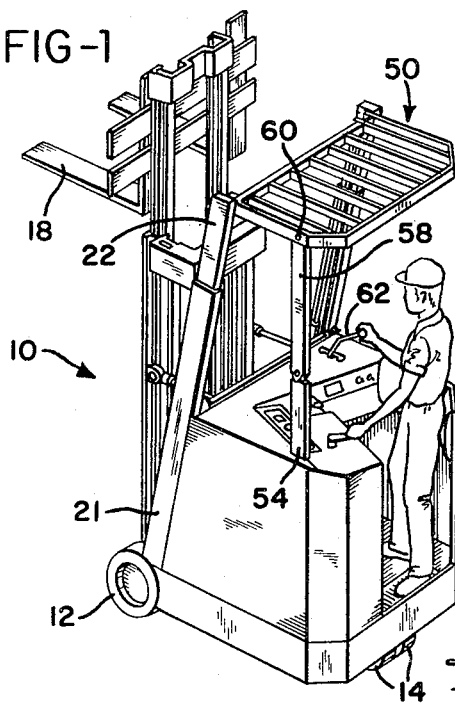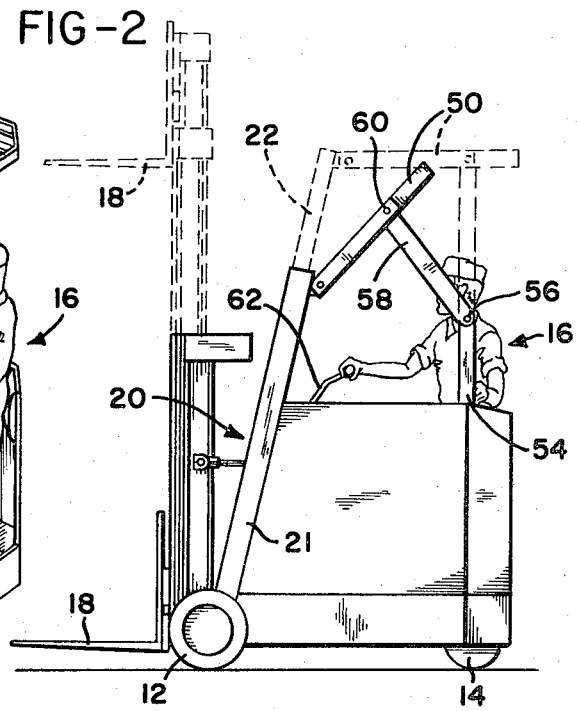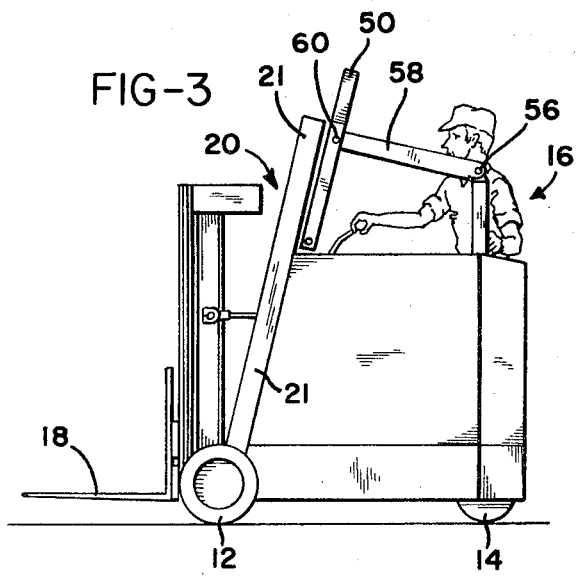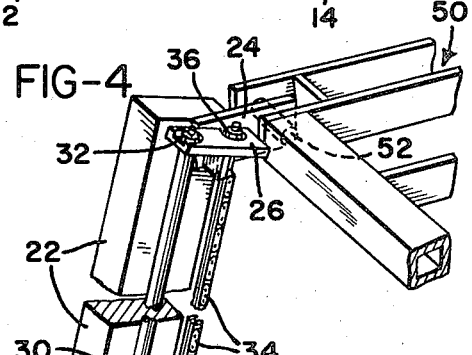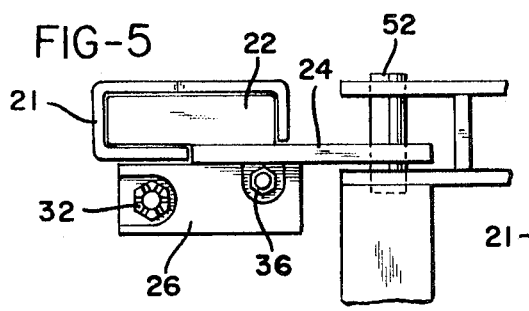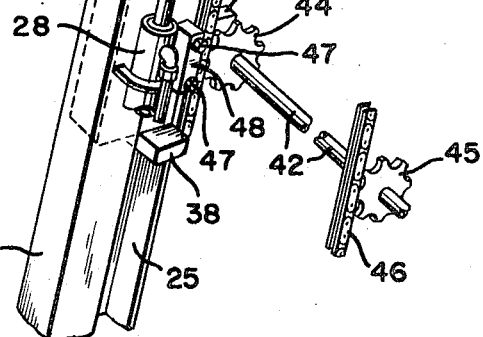

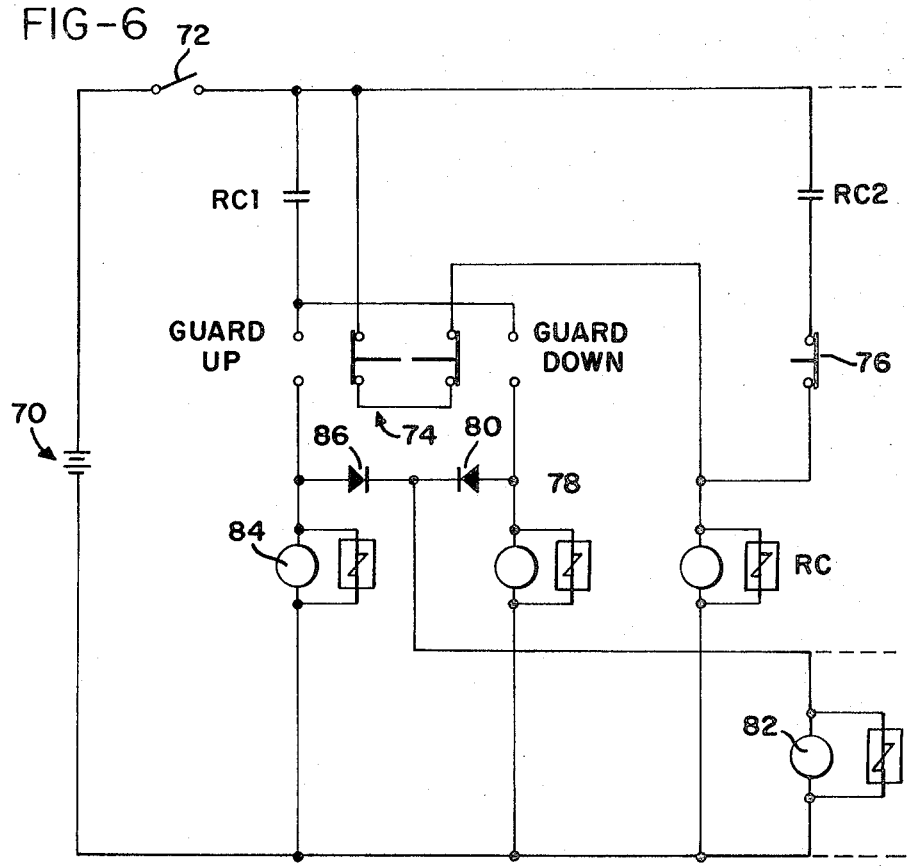

VEHICLE WITH RETRACTABLE GUARD

BACKGROUND OF THE INVENTION

In materials handling vehicles of the lift truck type the vehicle operator, unless otherwise protected, would be subject to injuries from objects falling from, for example, stacks between which the vehicle is operating. To obviate this problem, many vehicles of this type are provided with guards which shield the operator from such falling objects and in fact, safety regulations often require the use of guards.

However, such guards must project a substantial distance above the vehicle to accommodate the vehicle operator. This is turn limits the use of the vehicle to relatively high ceilinged areas. While this will ordinarily present no problems when the vehicle is operating in an area such as a warehouse, which will typically have a high ceiling, lower ceilinged areas will be inaccessible to the vehicle.

Thus, if it was desired to transport articles between a warehouse and a truck which was being loaded or unloaded, the ceiling height of the truck might restrict entry of the vehicle into the truck if the vehicle was provided with an overhead guard.

As a result, an additional handling operation would be required to move the materials being handled either into or out of the truck rather than simply allowing the vehicle to enter the truck to either deposit or remove the articles being handled.

Various solutions have been proposed for overcoming this problem. For example, U.S. Pat. No. 3,336,074 utilizes a collapsible overhead guard in which the upper sections of the front uprights supporting the guard can be unlatched from the lower sections thereof, and by pivoting the guard and its supports at several points, the guard can be collapsed and folded to the rear of the vehicle operator's seat.

U.S. Pat. No. 3,713,688 also discloses a lift truck in which the overhead guard can be positioned to the rear of the operator's seat and at a lower elevation. Similarly to U.S. Pat. No. 3,336,074, the upper sections of the forward upright are unlatched from the lower sections thereof and, through a parallelogram type linkage system, the overhead guard, together with the upper sections of the front uprights rigidly attached thereto are moved downwardly and to the rear of the vehicle.

While each of these constructions provide means for decreasing the overall height of the vehicle to which it is attached, it will be noted that separate operations must be performed by the vehicle operator to raise and lower the guard. Thus, the latches interconnecting the upper and lower sections of the forward uprights must be unlatched and the guard then moved either mechanically or with some sort of mechanical assist to the stowed position.

In accordance with good safety practice, such operation would probably require that the vehicle be temporarily halted while the guard is being either raised or lowered since it requires the operator to use both hands in at least the unlatching operation, if not the lowering of the guard itself.

SUMMARY OF THE INVENTION

The present invention is directed to a materials handling vehicle, such as a lift truck, which includes a retractable overhead guard positionable over the operator's station during normal operations, such as stacking, but which is movable, by a single operation which may be performed while the vehicle is moving, to a stowed position when the guard is not needed, thereby reducing the overall height of the vehicle and allowing it to enter relatively lower ceilinged areas which would be inaccessible to the vehicle with the guard in place.

Specifically, the guard includes a shield of grating-like structure which is mounted in its protective position over the operator's station by a plurality of uprights projecting upwardly from the vehicle. The uprights include a front pair of fixed, tubular, lower sections which telescopically receive a front pair of movable, upper sections. Adjacent the forward corners of the shield the upper sections are pivotally attached thereto, while a link is pivotally attached to the shield adjacent a rear corner thereof. The lower end of the link is pivotally attached to a fixed, rear upright which in turn is attached to a rear portion of the vehicle. Thus the shield and its supporting structure at all times remain interconnected, eliminating the necessity of latches and separate latching and unlatching operations.

A double acting, hydraulic piston and cylinder is mounted adjacent the front of the vehicle, fixed to one of the lower tubular sections, and a piston rod projects from the cylinder and is attached at its upper end to an upper end of one of the upper sections. A hydraulic pump supplies pressurized hydraulic fluid to the piston and cylinder and flow of pressurized hydraulic fluid to opposite sides of the piston is controlled by a switch actuated, solenoid operated valve, with the switch being accessible from the operator's station of the vehicle.

Thus, with the guard in the overhead, protective position, if the operator desires to lower the guard to its stowed position, he may do so without leaving the operator's station or stopping the vehicle by merely moving the selector switch to guard lowering position. This single action on the part of the operator will cause the upper sections to slide downwardly into the fixed lower sections of the front uprights while the link attached adjacent one of the rear corners of the shield pivots forwardly.

This will result in the shield to moving forwardly and downwardly in an arc to a stowed position, whereby it is substantially vertically oriented in front of the vehicle. Since the shield is being translated forwardly as its front edge moves downwardly there is no danger of it contacting the operator of the vehicle, and hence the shield can be lowered and raised while the operator's station is occupied and the vehicle is moving, and in fact, the controls for the system are accessible from the operator's station for this purpose.

In order to transmit movement of the piston to both forward upper sections, a pair of toothed sprockets are mounted for rotation on a cross shaft adjacent the front of the vehicle with the teeth of the sprockets engaging chains or similar structure attached to and movable with the upper sections.

BRIEF DESCRIPTION OF THE DRAWINGS

FIG. 1 is a perspective view showing the guard of the present invention in its protective position extending over the operator's station on the vehicle;

FIG. 2 is a side view showing the guard partially lowered in full lines and in its protective position in broken lines;

FIG. 3 is a view similar to FIG. 2 but showing the guard fully lowered to a stowed position;

FIG. 4 is a perspective view of a portion of the supporting and lowering mechanism;

FIG. 5 is a plan view of a portion of the protective shield and supporting structure associated therewith; and FIG. 6 is a circuit diagram showing that portion of the circuit associated with the vehicle for controlling operation of the guard.

DESCRIPTION OF THE PREFERRED EMBODIMENTS

As seen in FIG. 1 of the drawings, a materials handling vehicle 10 includes a pair of forward wheels 12, only one of which is shown, and a pair of rear wheels 14 for steering the vehicle. An operator's station 16 is positioned somewhat diagonally of the vehicle with the vehicle controls therefor accessible from the operator's station.

At the forward corners of the vehicle 10 are a pair of uprights 20, including fixed lower sections 21 and movable upper sections 22. The fixed uprights 21 are of hollow, tubular construction and slidably receive the movable upper sections 22 in telescoping relationship thereto. Upper sections 22 have plate members 24 attached thereto, as by welding, and the lower sections 21 are slotted, as at 25, to accommodate the attachment of the plate members 24 to their associated sections 22.

A second plate member 26 is fixed to each of the plate members 24, as best seen in FIGS. 4 and 5 of the drawings. A double acting, hydraulic piston and cylinder 28 is fixed to one of the front lower sections 21 and the piston rod 30 thereof is attached, as at 32, to the plate member 26. Thus, pressurizing opposite sides of the piston and cylinder 28 will cause the movable upper section 22 to move inwardly and outwardly of the fixed lower section 21.

A chain member 34 is attached to the plate 26 at 36 and at its lower end to a block 38 bolted to the lower end of the movable upper section 22. A pair of blocks 40, only one of which is shown in FIG. 4, are bolted to the rear surfaces of the fixed lower sections 21 and journal a cross shaft 42 which carries toothed sprockets 44 and 45 on each of its ends.

A second chain 46 is fixed to the left hand upper section 22 in the same manner as the chain 34 is attached to the right hand section 22. Each of the fixed lower sections 21 also has attached thereto by bolts 47 a backing block 48 positioned in front of each of the chains 34 and 46 in alignment with their respective toothed sprockets 44 and 45.

It will be seen, therefore, that as the right hand upper section 22 is moved upwardly and downwardly, this movement will be transmitted through the chain 34, right hand sprocket 44, cross shaft 42, left hand sprocket 45 and left hand chain 46 to the left hand upper section 22 so that both upper sections 22 are driven in synchronized movement by the single piston and cylinder 28.

A shield 50, which may be of grating construction, is pivotally attached adjacent its forward corners by means of pins 52 to the plate members 24. A fixed lower leg 54 is mounted adjacent a rear corner of the vehicle 10 and has pivotally attached thereto, as at 56, a link 58. Link 58 is also pivotally attached at its upper end to the shield 50 as seen at 60.

A control handle 62 may be provided, accessible from the operator's station and movable between a shield raising position, a neutral position and a shield lowering position, each of the positions being indicated by detents in the control panel.

With reference to FIGS. 1 through 3, it will be seen that with the guard in the raised or protective position, if the upper side of the piston and cylinder 28 is pressurized, the piston rod 30 will slide downwardly, carrying with it the upper telescopic sections 22. Since the shield 50 is pivotally attached at its forward corners to the upper telescopic sections 22, the shield will move downwardly along the front uprights. At the same time, the shield will pivot about its connection 60 with the link 58 while link 58 in turn pivots about its connection 56 to the fixed lower leg 54.

Thus, as the shield moves from its horizontal protective position over the operator's station to the substantially vertical, stowed position shown in FIG. 3, it moves in an arc, the front edge thereof moving downwardly along the front uprights while the shield pivots away from the rear uprights. There is, therefore, no interference with the operator during normal raising and lowering of the shield and hence, the raising and lowering switch can be controlled by the operator while he is positioned in the operator's station in the vehicle. Additionally, since the shield and supports therefor remain interconnected at all times actuation of the raising and lowering switch is the only operation required by the operator, and this can easily and safely be accomplished while the vehicle is moving.

With reference to FIG. 6 of the drawings, that portion of the vehicle circuit dealing with the raising and lowering of the shield will be described. The vehicle will normally be battery powered as indicated at 70 and provided with a key switch or the like 72 which will be closed during normal operations. The selector switch 74 will be in the neutral position and a pressure switch 76 will normally be closed. Closing key switch 72 will cause relay RC to be energized closing RC1 and RC2 and locking in relay RC.

Assuming that the guard is in the raised position, if the selector switch 74 is moved to the down position the guard lower solenoid 78 will be energized, opening a valve (not shown) controlled thereby, and power will be directed through the diode 80 to a hydraulic pump motor 82 sending pressurized fluid to the upper side of the piston and cylinder 28.

When the piston reaches the bottom of the cylinder, there will be a pressure build up, causing the pressure switch 76 to open at some preset pressure. This breaks the holding circuit to relay RC causing it to drop out, and this in turn opens RC1 and RC2, opening solenoid 78 and deenergizing the pump 82. Pressure will then decrease, allowing the pressure switch 76 to close.

Of course, when it is desired to raise the guard the selector switch 74 is moved to the guard up position. The selector switch 74 will move through the neutral position each time it is switched from the down to up position and, of course, from the up to down position. This allows the relay RC to be reenergized.

As the switch 74 moves on past the neutral position to the up position solenoid 84 is also energized, opening a valve (not shown) associated therewith, and, through the diode 86, energizing the pump motor 82, causing the lower side of the hydraulic cylinder 28 to be pressurized. When the piston within the cylinder has reached the upper limit of its travel, pressure will build up in the cylinder until the pressure switch 76 opens, deenergizing solenoid 84 and pump 82. Again, when this happens the pressure will decrease, allowing the pressure switch 76 to close.

From the above it will be seen that the present invention provides a retractable guard for a materials handling vehicle which may be lowered to a stowed position to decrease the overall height of the vehicle and raised to a protective position as required and which may be actuated in a single operation by the operator while the vehicle is moving.

While the form of apparatus herein described constitutes a preferred embodiment of the invention, it is to be understood that the invention is not limited to this precise form of apparatus, and that changes may be made therein without departing from the scope of the invention.

What is claimed is:

1. In a materials handling vehicle including an operator's station having vehicle controls adjacent thereto and accessible therefrom, an operator safety guard comprising:
   a. shield means for protecting said operator's station from objects falling thereon,
   b. support means including first and second upright means projecting upwardly from said vehicle and permanently attached to and between respectively the front and rear portions of said vehicle and said shield means,
   c. means for retracting and extending said first upright means and thereby moving said shield means between a substantially horizontal protective position over said operator's station and a substantially vertical, lowered position wherein the overall height of said vehicle is reduced,
   d. a first edge of said shield means during movement thereof moving with the extending end of said first upright means while the opposite edge of said shield means pivots in an arc about said first edge thereof.

2. The apparatus of claim 1 wherein:
   a. said first upright means includes upper and lower telescoping sections, and
   b. said moving means causes relative telescoping movement between said upper and lower sections.

3. The apparatus of claim 2 wherein:
   a. said moving means comprises fluid actuated piston and cylinder means associated with said first upright means for causing said relative telescoping movement between said upper and lower sections thereof.

4. The apparatus of claim 2 wherein:
   a. said first upright means includes a plurality of first uprights each including upper and lower sections,
   b. said moving means includes fluid actuated piston and cylinder means associated with one of said first uprights, and
   c. means is provided for transmitting relative telescoping movement between the upper and lower sections of said one of said first uprights to another of said first uprights.

5. The apparatus of claim 4 wherein said transmitting means includes:
   a. a toothed sprocket associated with a section of each of said first uprights,
   b. a rotatable shaft interconnecting each of said sprockets, and
   c. means engageable by the teeth of said sprockets mounted on the other of said sections of each of said first uprights.

6. The apparatus of claim 2 wherein said second upright means includes:
   a. a fixed lower leg,
   b. link means extending between said shield means and said fixed lower leg, and
   c. means pivotally mounting said link means adjacent one end thereof on said shield means and adjacent an opposite end thereof on said fixed lower leg.

7. The apparatus of claim 6 wherein:
   a. said fixed lower leg of said second upright means is mounted adjacent one side of said vehicle.

8. The apparatus of claim 1 wherein:
   a. said vehicle controls accessible from said operator's station include controls for said shield moving means.

9. The apparatus of claim 1 wherein said shield moving means includes:
   a. fluid actuated piston and cylinder means,
   b. solenoid means for directing pressurized fluid selectively to opposite sides of said piston of said piston and cylinder means, and
   c. switch means controlling said solenoid means.

10. In a materials handling vehicle including an operator's station having vehicle controls adjacent thereto and accessible therefrom, an operator safety guard comprising:
    a. a pair of fixed, tubular, lower, upright sections mounted adjacent the forward end of said vehicle and having means defining inwardly facing longitudinally extending slots therein,
    b. a pair of upper upright sections telescopically received in said lower upright sections and having inwardly projecting portions extending through said slots,
    c. a protective shield of grating construction pivotally attached adjacent a forward edge thereof to said inwardly projecting portions of each of said upper sections,
    d. a chain mounted on and extending longitudinally of each of said upper sections,
    e. a toothed sprocket rotatably mounted on each of said lower sections with the teeth thereof in engagement with one of said chains and interconnected by a cross shaft for transmitting movement of one of said upper sections to the other thereof,
    f. a double acting, hydraulic piston and cylinder with the cylinder thereof fixed with respect to one of said lower sections and said piston thereof interconnected by means of a piston rod to said one of said upper sections,
    g. solenoid means for selectively directing pressurized hydraulic fluid to opposite sides of said piston,
    h. switch means for controlling said solenoid means,
    i. a fixed lower leg mounted adjacent the rear of said vehicle, and j. a link pivotally mounted adjacent its lower end to said fixed rear leg and adjacent its upper end to said shield means.

11. In a materials handling vehicle including an operator's station having vehicle controls adjacent thereto and accessible therefrom, an operator safety guard comprising:
   a. shield means for protecting said operator's station from objects falling thereon,
   b. upright means including upper and lower sections permanently joined for longitudinal movement with respect to each other,
   c. said lower sections being fixed to said vehicle and said upper sections being permanently and pivotally attached to said shield means,
   d. means for causing said relative longitudinal movement between said upper and lower sections, and
   e. means for pivoting said shield means about its pivotal connection to said upper sections as said upper sections are moved with respect to said lower sections to cause said shield means to assume a position substantially parallel to said upright means when said upper sections are moved downwardly and a position overlying said operator's station when said upper sections are moved upwardly.

* * * * *